Patented May 11, 1954

2,678,265

UNITED STATES PATENT OFFICE 2,678,265

WEED CONTROL

Arthur Schwerdle, Vineland, N. J., assignor to Vineland Chemical Company, Vineland, N. J., a firm No Drawing. Application July 5, 1951,
Serial No. 235,381

8 Claims. (Cl. 71—2.7)

The object of the invention is to provide improvements in the control of weeds in lawns, gardens and farms, and more specifically in the use of certain chemicals and combinations of chemicals, which when sprayed or dusted over an area of combined grass and weeds, including crabgrass, will destroy the latter without injuring the former to a substantial degree.

It has long been known that certain chemicals at relatively low concentrations will control certain plants selectively without harming others, but heretofore it has been difficult if not impossible to control certain weeds without adversely affecting other plants, such as clover and various sorts of grasses.

One of the commonest weeds in lawns, golf-greens and farms is crabgrass (Digitaria Sanguinalis) of which several varieties exist, including D. Longiflora and D. Serotina. These, it has been found, can be destroyed without adversely affecting the generally desired grasses and clover, by powder-dusting, spraying in solution, or gaseous or liquid suspension, and other possible means of application.

Individually, numerous chemicals are somewhat selective but are not entirely satisfactory. For example, long alkyl chain alkoxy mercuri compounds show preferential crabgrass control, but such quantities are required as to make them uneconomical. Phenyl mercuric compounds, such as acetate, propionate, lactate and oleate may be used in much lower concentration, so that instead of requiring the order of 1:200 as with the first mentioned, the concentration may be reduced to 1:2000 to 1:5000 for each application. Fine lawn grasses such as Fescues are more sensitive and require more dilute applications. In any case this type of composition requires several applications. The desirable grasses are also adversely affected to a certain extent, since the differential or preferentiality is not as wide as desirable. Especially in dry hot weather good grasses are subject to excessive tip injury, if not actually destroyed. One application is not sufficient, since insufficient preferentiality obtains, thereby making a composition characterized by greater selectivity or preferentiality practically mandatory. Furthermore, crabgrass in its advanced stages is notably very difficult to control by organic mercury salts.

2,4-dichlorphenoxy acetic acid and its salts show a marked selective action against crabgrass in the earlier stages of growth, but are almost entirely ineffective during the later stages. These and related hormones, or substances inducing hormone like action, show a more or less selective action against broad-leafed plants (dicotyledon), as constrasted with grasses (monocotyledons), but a good, all-season preferential effect against annual rather than perennial grasses is not effected. Moreover, the singularity of the treatment is most notable for broad-leafed plant control such as dandelion. Clover, too, is damaged, which is generally undesirable. Also, compositions of this nature alone or conjointly with phenyl mercury salts or other herbicides are difficult to control, since herbicides of this nature are not specific plant poisons, but embody hormone characteristics which produces a generic effect upon plants as a group rather than as a specific poison. Accordingly, undesirable side reactions occur such as deformations of desirable shrubs, trees, grasses, vegetables, etc., wherefore their use is not free from collateral effects.

Cyanates of alkali metals show a favorable preferential action against crabgrass late in the season, when the grass is in a branched reddish purple seed-bearing stage of development, and incidentally when most objectionable in appearance. However, it is ineffective during the earlier part of a season's growth, which fact is obviously undesirable, since growth must be controlled at all stages and throughout the growing season, as otherwise the crabgrass eliminates other desirable grasses by its own rapid propogation and spread. Furthermore, it is necessary to make repeated applications of this class of chemicals, because a single application of sufficient strength to eliminate the crabgrass will destroy all herbage. Like other chemicals heretofore known, it is not as preferential as the class herein described.

As a result of the extremely deleterious and pesteriferous nature of crabgrass, and the lack of perfection of all known crabgrass control agents, research was undertaken to develop and perfect a new composition of chemicals, evidencing synergistic action, such as would prove to be completely selective as to crabgrass, require but one application and be effective through the growing season, while exhibiting no deleterious effects upon desirable grasses. Such a composition of material is not easily produced in the first instance, and there is no known rule or law that either governs or suggests its constituents, as when considered individually the incremental advantage of each component substance may not of itself be great, but when forming a part of the whole its combination with the other elements effects a most significant and not fully explicable result, that at no stage in its development is predictable.

In view of the fact that organo mercurials exert a selective herbicidal effect, and the most pronounced effects are exhibited by the phenyl mercuri group, while less pronounced in the mercuriated aniline, phenol, xylene, toluene, chlorobenzene and others, it appeared rational to assume that arsenic analogues, such as phenyl arsonic acid and nitrophenyl arsonic acid and the salts thereof, as well as similar compositions such as benzyl arsonic acid, dichlorbenzyl arsonic acid, and allyl arsonic acid, might likewise produce such an effect, especially since inorganic arsenicals already had shown a slight preferential activity against crabgrass, whereas inorganic mercury compounds had not exhibited such characteristic and organic mercury compounds had.

In testing the effect of organo arsenicals, it developed that the phenyl arsonic acids were inferior to the alkyl anologues, an effect which could not be predicted as the opposite result, i. e. phenyl better than alkyl might by prediction be rated first choice. Thus, phenyl arsonic acid is not as good a selective herbicide as, for example, methyl arsonic acid, though it bears the closest resemblance to phenyl mercuric hydroxide. Benzyl arsonic acids and chloro derivatives showed greater efficiency than phenyl arsonic acid, but substantially less than the alkyl arsenicals. Furthermore, it was noted that a marked difference existed between inorganic and alkyl arsenicals, not only in the concentration required to achieve a predetermined result, but also in the rapidity with which depredation of the crabgrass was effected.

Thus, the well known sodium arsenate showed initial injury to crabgrass in 24 to 48 hours, dimethyl arsonic acid (i. e., cacodylic acid) in 3 to 5 days, and methyl sodium arsonate in from 2 to 7 days, wherefore it became evident that the conjoint use of these three, and/or similar compounds of the alkyl groups variations, could be expected to effectively attack crabgrass through the entire period and range of its growth with but a single application of the proper concentration.

At the present status of knowledge of the subject, the alkali salts, such as sodium, potassium, calcium and magnesium salts, are preferred, although free acids, and organic and other inorganic salts, such as iron salts, can be used. Examples of organic salts are the ethanolamine and morpholine salts. As illustrative of the mode of action and the decided advantage of the organo arsenicals, the following are cited: for example, sodium arsenate may be applied with a garden sprayer at the approximate rate of 1000 cc. of $\frac{1}{10}$% solution (1:1000) per 20 square feet of lawn, and cause yellowing (etiolation) of the crabgrass leaves, or a browning and withering of the peripheral leaves but without substantial effect upon the central stalk, so that the plant will survive and continue to grow, while no adverse effect upon neighboring desirable grasses is noted, and higher concentrations actually harm such desirable grasses. Repeated doses may in time destroy the crabgrass, but only at a price of concomitant normal grass injury or destruction. Sodium arsenate of 1:3000 used conjointly with phenyl mercuric acetate and a single application evidences but little control, and when phenyl mercuric acetate at a concentration of 1:2500 is similarly used, it is found to be markedly inferior to the best of the organo arsenicals.

Benzyl arsonic acid, phenyl arsonic acid and 2,4-dichlorbenzyl arsonic acid, sprayed at the rate of 1:250 showed some destruction of crabgrass, but at most produced only a relatively slight yellowing, or only marked tip injury as in the case of the benzyl compounds. Dimethyl arsonic acid or its salts showed by far the greatest activity as a destroyer of crabgrass. At one part in 1000 of water and sprayed in the same manner and rate mentioned, it either destroys all lawn grasses present in a test area, or destroys some and injures other more resistant varieties that are present in a test area. At 1:5000 it is too dilute and does not affect any grasses to a substantial degree. The optimum for one or more sprays of this composition alone is approximately 1:1500.

Sodium methyl arsonate is not as strong a herbicide as the dimethyl arsonate, but it is more selective for the purposes in mind. It will not in a single application at 1:1000 concentration selectively destroy crabgrass, as will the dimethyl analogue, but does produce a deleterious effect without being sufficient to destroy it. The best single dose destruction is effected at a concentration of approximately 1:250 to 1:500, it being less critical than the dimethyl analogue. As before mentioned, the methyl arsonate is slower, but more selective and more permanent in its action. If the grasses are first weakened by the inclusion of sodium arsenate, the later effects of the alkyl arsonates are more pronounced. Likewise, the monomethyl arsonate being slower to function than the dimethyl arsonate, the two in conjunction appear to act synergistically, or give evidence of phase sequence of progressive weakening, while they do not heavily injure clover and broad leafed plants, as do other herbicides.

Thus, one of the preferred formulas for crabgrass control is one in which is included, on the basis of inert material such as water, 1:1000 sodium arsenate, 1:1500 sodium dimethyl arsonate, and 1:250 sodium methyl arsonate. However, while this proportion has been found to produce optimum results under a wide variety of conditions, slight variations one way or another may be made and still obtain effective crabgrass destruction with relatively little deleterious effects upon clover and the desirable grasses present.

Sodium methyl arsonate alone has been found to be as selective and more as any combination last set forth, but is decidedly more expensive. However, it is preferable in the early growing season, because at this time the dimethyl arsonate is too injurious to be included in any except very dilute amounts. Optionally, sodium arsenate may be added in amounts up to about one-tenth of the sodium methyl arsonate, but is not mandatory.

The free acids or derivatives of other aliphatic arsonics, such as the ethyl, propyl, allyl and butyl arsonics, may likewise be used.

Thus the composition employed in accordance with the present invention for the selective control of crabgrass comprises a mixture of at least one arsenic compound selected from the group consisting of arsonic acids having the formula:

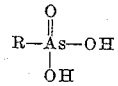

where R is an aliphatic group selected from the group consisting of methyl, ethyl, propyl, allyl and butyl, and salts thereof, and an inert diluent therefor.

It is to be understood that the inclusion of other active materials for whatever purposes desired is within the purview of the present invention. For example, other herbicides such as inorganic arsenic compounds, such as sodium arsenate, sodium cyanate, thiocyanate, phenyl mercury salts and salts of chlorphenoxy acetic acids may be included in the composition employed in accordance with the present invention.

Having thus described my invention, what I claim and desire to protect by Letters Patent of the United States is:

1. The method of selectively controlling the growth of crabgrass which comprises applying to an area containing crabgrass a composition comprising a mixture of at least one arsenic compound selected from the group consisting of arsonic acids having the formula:

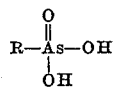

where R is an aliphatic group selected from the group consisting of methyl, ethyl, propyl, allyl and butyl, and salts thereof; and an inert diluent therefor, in a concentration and amount sufficient to destroy crabgrasses but insufficient to destroy material quantities of the useful grasses and plants.

2. The method of claim 1 wherein R is methyl.
3. The method of claim 1 wherein R is ethyl.
4. The method of claim 3 wherein the arsonic compound is the sodium salt.
5. The method of claim 1 wherein R is propyl.
6. The method of claim 1 wherein R is allyl.
7. The method of claim 1 wherein R is butyl.
8. The method of claim 1 wherein the arsonic compound is a sodium salt.

References Cited in the file of this patent

UNITED STATES PATENTS

| Number | Name | Date |
|---|---|---|
| 1,686,582 | Stolzenberg | Oct. 9, 1928 |
| 2,160,929 | Warner et al. | June 6, 1939 |

OTHER REFERENCES

Karrer, "Organic Chemistry," published by Elsevier Pub. Co. Inc., New York, 2nd English edition (1946), page 138.

Chemical Abstracts, vol. 38 (1944), col. $3610^2$.
Chemical Abstracts, vol. 42 (1948), col. $4710^9$.